US012131575B1

(12) United States Patent
Aggarwal et al.

(10) Patent No.: US 12,131,575 B1
(45) Date of Patent: *Oct. 29, 2024

(54) SYSTEM FOR SINGLE IMAGE MULTIMODAL BIOMETRIC RECOGNITION

(71) Applicant: AMAZON TECHNOLOGIES, INC., Seattle, WA (US)

(72) Inventors: Manoj Aggarwal, Seattle, WA (US); Gerard Guy Medioni, Los Angeles, CA (US); Rajeev Ranjan, Seattle, WA (US); Joshua Engelsma, Jenison, MI (US); Baomin Wang, Seattle, WA (US); Abhinav Kashyap, Redmond, WA (US); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,273

(22) Filed: May 13, 2022

(51) Int. Cl.
| | |
|---|---|
| G06V 40/12 | (2022.01) |
| G02B 5/20 | (2006.01) |
| G02B 5/30 | (2006.01) |
| G06V 10/145 | (2022.01) |
| G06V 40/13 | (2022.01) |
| G06V 40/50 | (2022.01) |

(52) U.S. Cl.
CPC ........ *G06V 40/1365* (2022.01); *G06V 10/145* (2022.01); *G06V 40/1318* (2022.01); *G06V 40/1347* (2022.01); *G06V 40/50* (2022.01); *G02B 5/208* (2013.01); *G02B 5/3025* (2013.01)

(58) Field of Classification Search
CPC .. G06V 40/1318; G06V 10/95; G06F 18/213; G06F 18/2148
See application file for complete search history.

(56) References Cited

U.S. PATENT DOCUMENTS

| | | | |
|---|---|---|---|
| 2021/0073648 A1* | 3/2021 | Lichenstein | G06N 5/04 |
| 2021/0141896 A1* | 5/2021 | Streit | G06F 21/554 |
| 2022/0300593 A1* | 9/2022 | Brownlee | G06V 40/1353 |

* cited by examiner

*Primary Examiner* — Edward F Urban
*Assistant Examiner* — Wassim Mahrouka
(74) *Attorney, Agent, or Firm* — Lindauer Law, PLLC

(57) ABSTRACT

A biometric identification system acquires a multimodal image. The system is trained to determine three embeddings: a first embedding associated with features present in a first modality, an intersection embedding associated with features present in both the first and a second modality, and an XOR embedding associated with features that are not shared between the first modality and the second modality. Once trained, the system may process a multimodal query image to determine query embedding data. Additional information, such as minutiae depicted in the multimodal query image may also be determined. The query embedding data, and in some implementations the additional information, may be compared with enrolled embedding data associated with a previously enrolled user. If the comparison exceeds a threshold value, an identity may be asserted.

20 Claims, 12 Drawing Sheets

SYSTEM FOR SINGLE IMAGE MULTIMODAL BIOMETRIC RECOGNITION

BACKGROUND

Biometric input data may be used to recognize and assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
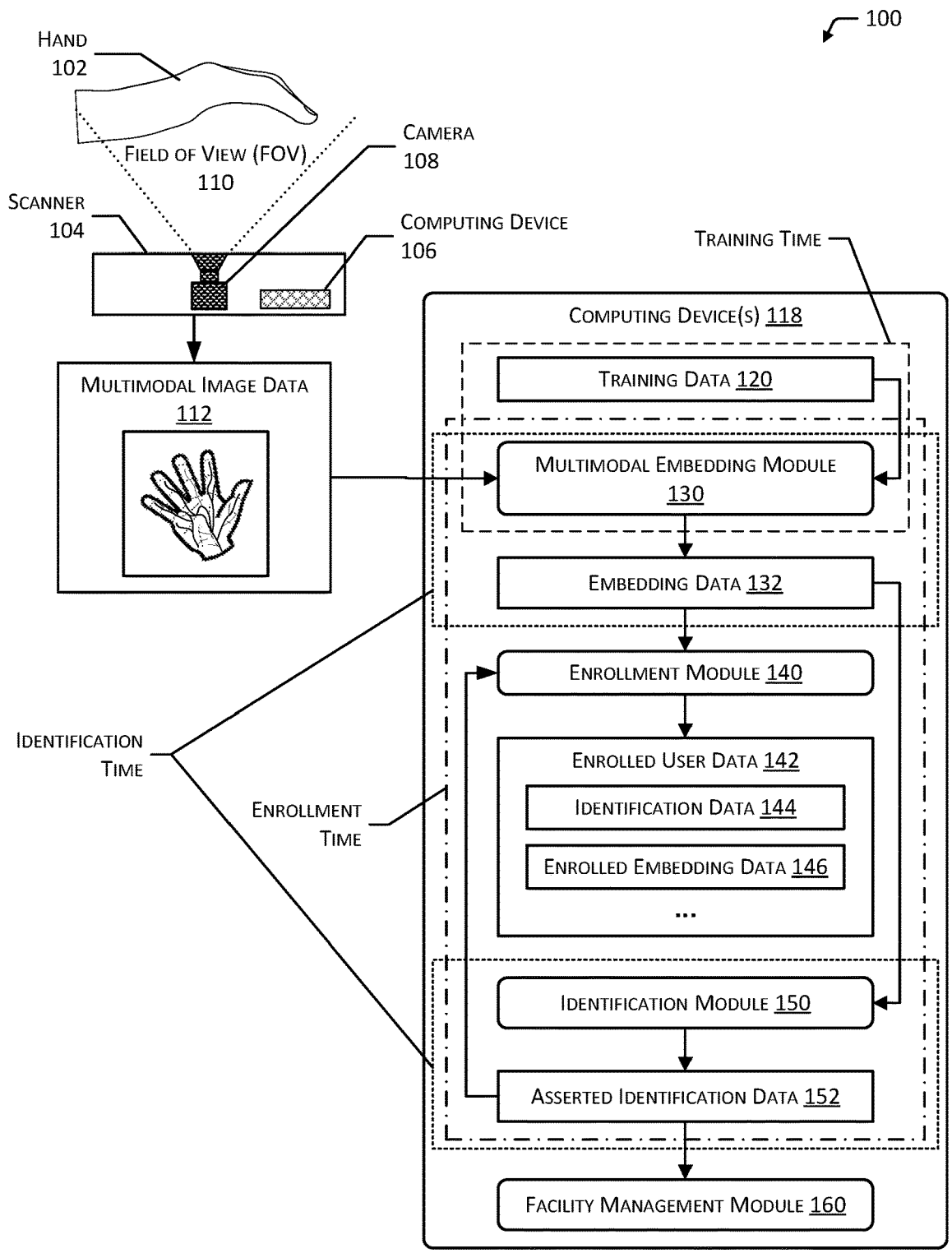
FIG. 1 illustrates a system to train and use a single image multimodal biometric recognition system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data, such as used for biometric identification, may be acquired using one or more modalities. For example, a first modality may comprise images of surface skin of a user's palm while a second modality may comprise images of subcutaneous features such as veins of the user's palm. The use of input data that includes two or more modalities provides several advantages for biometric identification. One advantage is the potential for decorrelation between the modalities that may improve overall accuracy. For example, each modality may "see" different features, providing more distinct information that may better distinguish one person from another, determine the presence of an artifact such as a realistic-appearing face mask or fake hand, and so forth.

However, the hardware used to acquire separate images for the two or more modalities may be expensive to manufacture. For example, acquisition of separate images for each of the modalities may involve the use of two or more polarizers, multiple cameras, specialized illumination, synchronization circuitry, and so forth. Once acquired, the images associated with the separate modalities may require additional processing to address issues such as alignment of the separate images due to changes in position of the user between frames, variations in image quality between the different modalities, and so forth.

Traditional biometric systems have been limited to using a single modality, such as images of only veins or only surface features, or have relied on more complex systems to acquire images using the two or more modalities.

Described in this disclosure are systems and techniques for acquiring and processing multimodal images that include features of the user that are associated with a plurality of modalities. For example, a multimodal image may include surface and subcutaneous features. A machine learning system is trained to process a multimodal image to determine first embedding data that is representative of the features in the multimodal image, intersection embedding data that is representative of features that are present in more than one modality, and "exclusive or" (XOR) embedding data representative of features that are not present in more than one modality. The first embedding data, intersection embedding data, and the XOR embedding data may then be compared with previously stored data acquired during enrollment to assert an identity. In some implementations, other techniques such as minutiae matching may also be used to assert the identity.

Illustrative System

FIG. 1 illustrates a system 100 for training and using a single image multimodal biometric recognition system, according to some implementations. The system 100 is described as being used as part of a biometric identification system that determines an identity of a user. However, the system and techniques described herein may be used in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires multimodal images of an object in the FOV 110, such as the hand 102, and provides multimodal image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation, the scanner 104 is configured to acquire images of the hand 102 that are illuminated using infrared light. The infrared light illuminating the FOV 110 may be randomly polarized. For example, during operation the user may present their hand 102 with the palm or volar region of the hand toward the scanner 104 and within the FOV 110. As a result, the multimodal image data 112 provides an image of the anterior portion of the hand 102. In other implementations, the multimodal image data 112 may include the back of the hand 102. Because at least some of the infrared light passes through the epidermis and into the subcutaneous dermal layers, the resulting image is multimodal in that it includes both surface and subcutaneous features such as veins and other interior structures.

In comparison, separate images may be acquired using different combinations of polarized infrared light and a polarizer in an optical path of the camera 108 to acquire discrete modalities. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features such as arteries, veins, muscle tissue, and so forth.

Separate images of the first and second modalities may be acquired using different combinations of polarized light provided by infrared lights. For example, by altering the relative combinations of illuminating polarization and polarization of the light impinging on the camera 108, first modality image data and second modality image data may be acquired in succession. However, in comparison to the scanner 104 described in this disclosure, acquisition of discrete first and second modality images requires a more complex and costly scanner, as well as additional subsequent data processing. The scanner 104 is described in more detail with respect to FIGS. 9A-9D.

A computing device 118 is shown. The one or more computing device(s) 118 may execute one or more of the following modules.

During a "training time" training data 120 is used to train a multimodal embedding module 130 to determine embedding data 132. In one implementation, the training data 120 may comprise a plurality of first modality and second modality images that have been labeled. For example, label data may indicate the sample identifier, identity label, modality label, and so forth. The training data 120 is discussed in more detail with regard to FIG. 3.

The multimodal embedding module 130 may comprise a machine learning network having several different portions. As part of the training the multimodal embedding module 130, or portions thereof, determine trained model data that is associated with one or more of the portions of the machine learning network. The machine learning network and the training process are discussed in more detail with respect to FIGS. 2-5.

The multimodal embedding module 130 comprises a machine learning network that includes several portions including one or more backbones, a first embedding portion, an intersection portion, and an XOR portion. The intersection portion facilitates learning to generate embedding data that is representative of features present in both modalities. The XOR portion facilitates learning to generate embedding data representing features that are distinct or exclusive as between the first modality and the second modality. The intersection and XOR are discussed in more detail with regard to FIG. 2.

Once trained, the multimodal embedding module 130, or a portion thereof, may be used at inference to process input such as multimodal image data 112 and provide as output the embedding data 132. In one implementation, the embedding data 132 may comprise first embedding data, intersection embedding data, and XOR embedding data. The operation of the trained multimodal embedding module 130 is discussed in more detail with regard to FIG. 6.

During "enrollment time", users are able to utilize the system 100 by performing an enrollment process. An enrollment module 140 may coordinate the enrollment process. Enrollment may associate biometric information, such as embedding data 132 with particular information such as a name, account number, and so forth.

During an enrollment process, the user opts in and presents their hand 102 to the scanner 104. The scanner 104 provides multimodal image data 112 to a computing device 118 executing the trained multimodal embedding module 130. The trained multimodal embedding module 130 accepts as input the multimodal image data 112 and provides as output embedding data 132. The embedding data 132 is representative of at least some of the features depicted in the multimodal image data 112. In some implementations, the embedding data 132 may comprise one or more vector values in one or more embedding spaces.

During the enrollment process, the submitted embedding data 132 may be checked using an identification module 150 to determine whether the user has been previously enrolled. A successful enrollment may comprise storage of enrolled user data 142 comprising identification data 144, such as name, telephone number, account number, and so forth and storage of one or more of the embedding data 132 or data based thereon as enrolled embedding data 146. In some implementations, the enrolled embedding data 146 may comprise additional information associated with processing of the multimodal image data 112 with the multimodal embedding module 130. For example, the enrolled embedding data 142 may comprise intermediate layer data, such as the values of a penultimate layer of one or more portions of the multimodal embedding module 130.

During "identification time" the (as yet unidentified) a user presents their hand 102 at the scanner 104. The resulting query multimodal image data 112 may be processed by the (now trained) multimodal embedding module 130 to determine embedding data 132. In some implementations, the computing device 106, and may execute a trained multimodal embedding module(s) 130. The computing device 106 may perform other functions, such as encryption and transmission of the multimodal image data 112 or data based thereon, such as the embedding data 132.

The identification module 150 executing on the computing device(s) 118 may compare input embedding data 132 associated with the multimodal image data 112 acquired by the scanner 104 to previously stored data, such as the enrolled embedding data 146 to determine asserted identification data 152. In one implementation, the asserted identification data 152 may comprise a user identifier associated with the closest, in the embedding space(s), previously stored enrolled embedding data 146 relative to the input embedding data 132 associated with the user who presented their hand 102 during identification time. The identification module 150 may utilize other considerations, such as requiring that the queried embedding data 132 is no more than a maximum distance in the embedding space from the enrolled embedding data 146 of a particular user before determining the asserted identification data 152. The identification module 150 is discussed in more detail with regard to FIG. 7.

The asserted identification data 152 may then be used by subsequent systems or modules. For example, the asserted identification data 152, or information based thereon, may be provided to a facility management module 160.

The facility management module 160 may use the asserted identification data 152 to associate an identity with the user as they move about a facility. For example, the facility management module 160 may use data from cameras or other sensors in the environment to determine a location of the user. Given a known path of the user from an entrance that utilizes the scanner 104, the user identity indicated in the identification data 144 may be associated with the user as they use the facility. For example, the now identified user may walk to a shelf, remove an item, and leave the facility. The facility management module 160 may determine the interaction data indicative of the removal of the item as being associated with the user identifier specified in the asserted identification data 152, and bill an account associated with the user identifier. In another implementation, the facility management module 160 may comprise a point of sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 2:
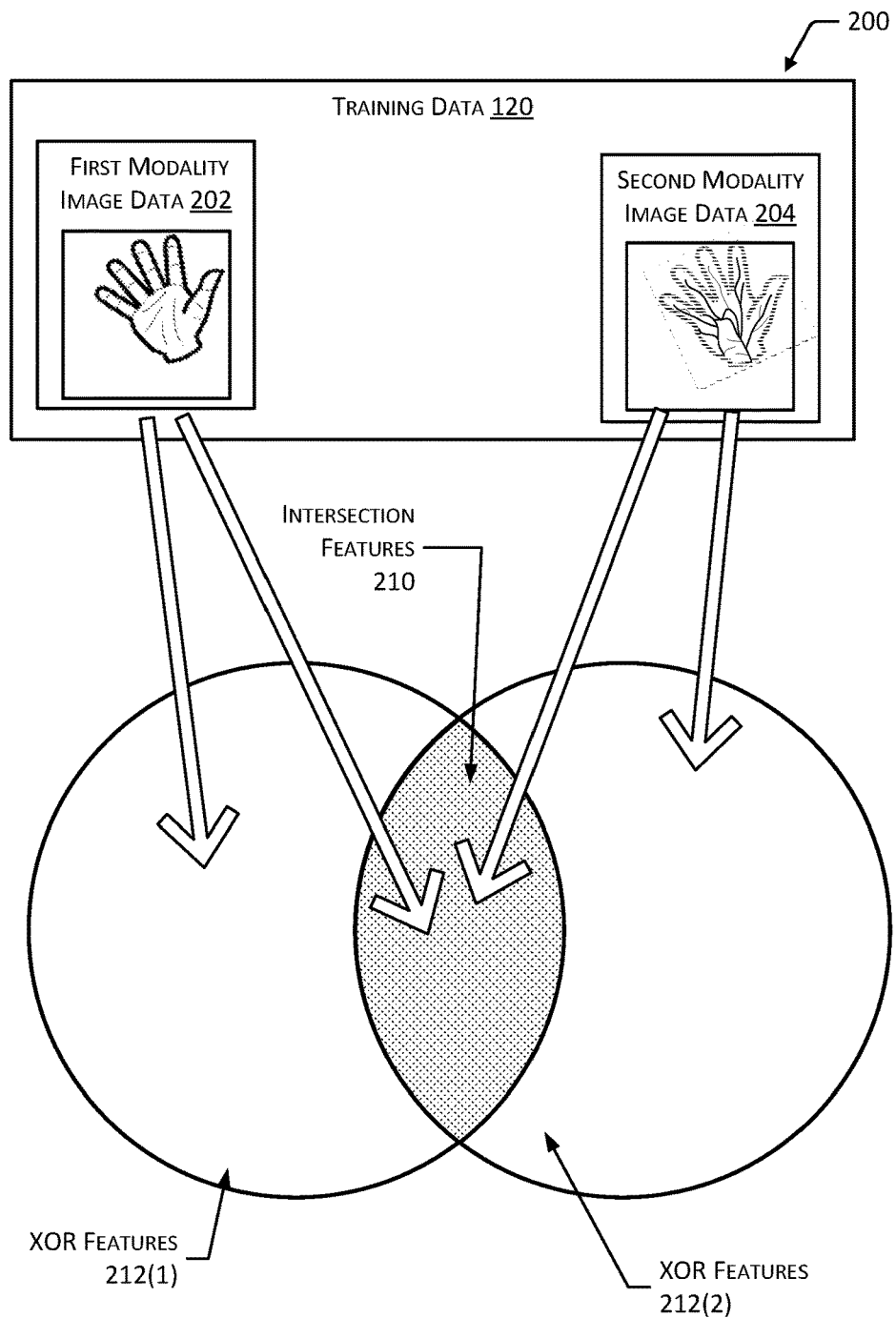
FIG. 2 is a diagram illustrating intersection features and XOR modality features for different modalities, according to some implementations.

FIG. 2 is a diagram 200 illustrating intersection features and XOR modality features for different modalities, according to some implementations. Training data 120 is shown, comprising first modality image data 202 and second modality image data 204. This disclosure describes systems and techniques using two modalities by way of illustration, and not necessarily as a limitation. In some implementations, additional modalities may be used. For example, an Mth modality may be used that comprises a color visible light image such as produced by a red-green-blue (RGB) camera, a thermal image as produced by a thermal imaging camera, or other information.

Depending on the techniques used to acquire an image, images may contain features that are common across two or more modalities (an intersection), or distinct with respect to the other modalities (an exclusive "or", or "XOR"). In the following example, the first modality image data 202 depicts surface features of the hand 102 and the second modality image data 204 depicts subcutaneous features of the hand 102. Some examples of features that are common across both modalities are the overall outline of the hand, deep creases in the palm and joints, and so forth. Features such as these would be represented in the overlap between modalities, shown as the intersection features 210. In comparison, a feature that appears in one modality but not in another may be considered distinct or exclusive. The first modality XOR features 212(1) are those features that are distinct to the first modality. The second modality XOR features 212(2) are those features that are distinct to the second modality. Continuing the earlier example, the first modality XOR features 212(1) may include fine details such as friction ridges present on fingers and palm. In comparison, the second modality XOR features 212(2) may include vein patterns beneath the skin.

By training the multimodal embedding module 130 as described herein, the system 100 is able to explicitly utilize information about the intersection features 210 as well as the XOR features 212 to determine the embedding data 132. Because the multimodal embedding module 130 is trained utilizing loss values relating to both the intersection and the XOR features, the system learns to decorrelate features that are common across modalities. Colloquially, it may be said that portions of the system learn to extract features that are unique to a particular modality, minimizing learning features that may be present across modalities that are highly correlated.

In some implementations involving three or more modalities (not shown), the system 100 may utilize information for partial intersection features. The partial intersection features comprise those features represented in the overlap between two or more modalities, but less than all modalities. For example, a partial intersection feature may comprise a feature that is represented in two modalities but not the third modality.

Figure 3:
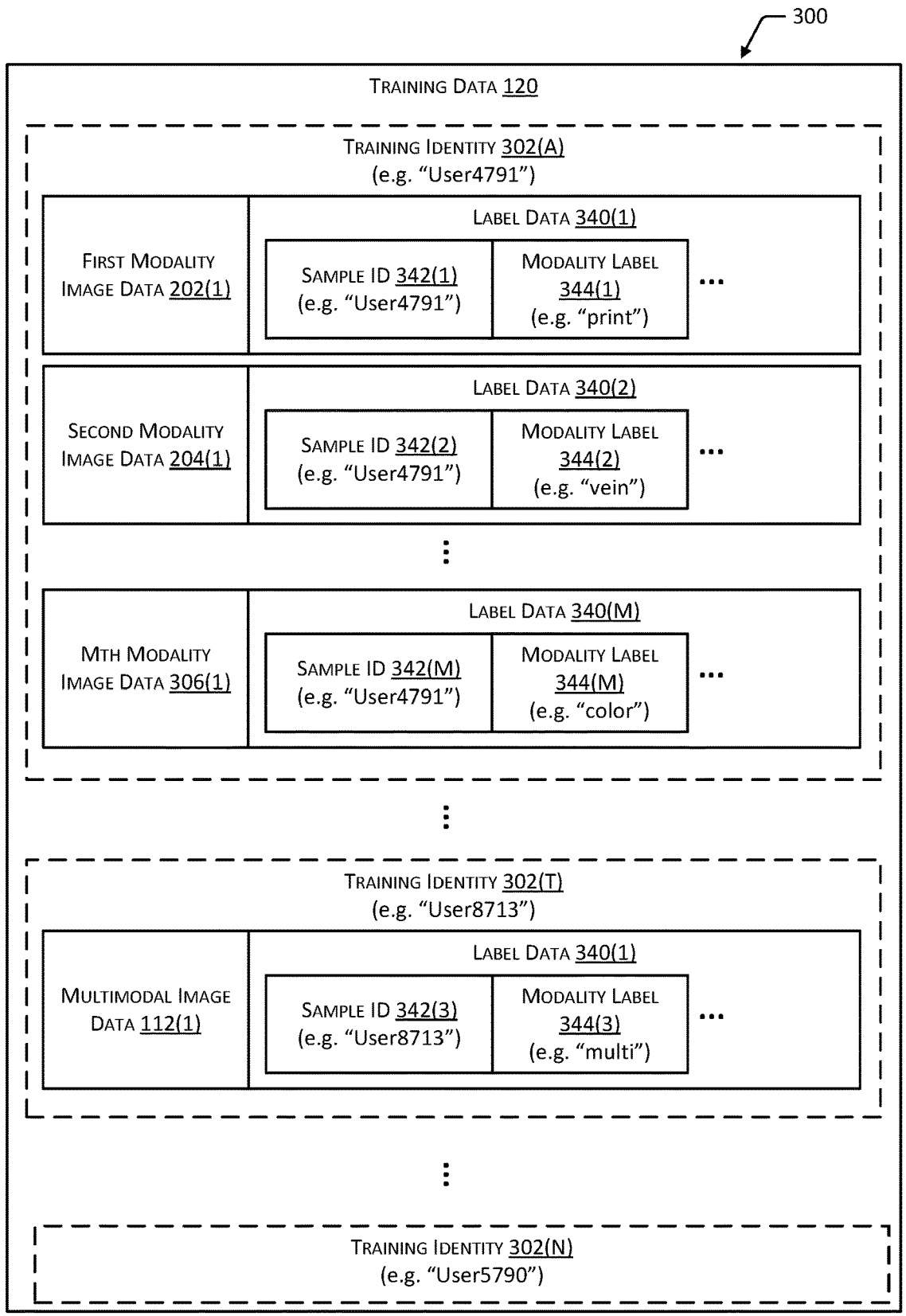
FIG. 3 illustrates training data that is labeled for training the multimodal decorrelated embedding model, according to some implementations.

FIG. 3 illustrates at 300 training data 120 that is labeled for training the multimodal embedding module 130, according to some implementations. The training data 120 comprises a plurality of images that are representative of a plurality of training identities, 302(1), 302(2), . . . , 302(N). Each training identity 302 is considered to be unique with respect to the other training identities 302.

The information associated with each training identity 302 may comprise actual image data acquired from users who have opted in to provide information for training, synthetic input data that has been generated, or a combination thereof. In one implementation, the training data 120 may exclude individuals who have enrolled to use of the system for identification. For example, enrolled users having identification data 144 may be excluded from inclusion in the training data 120. In another implementation, some enrolled users may opt in to explicitly permit image data obtained during enrollment to be stored as training data 120.

The synthetic input data may comprise synthetic data that is consistent with one or more of the expected multimodal image data 112, first modality image data 202, second modality image data 204, or other data used for training. For example, the synthetic input data may comprise output from a generative adversarial network (GAN) that has been trained to produce synthetic images of a user's hand.

In some implementations, the synthetic input data may be based on actual input data. For example, multimodal image data 112 may be processed using a GAN to generate one or more of first modality image data 202 or second modality image data 204. In other implementations, other techniques may be used to determine the synthetic input data.

Each training identity 302(1)-302(N) includes modality image data and associated label data 340. The label data 340 may comprise information such as a sample identifier (ID) 342, modality label 344, and so forth. The sample ID 342 indicates a particular training identity 302. The sample ID 342 may be used to distinguish one training identity 302 from another. In implementations where actual input data is used as part of the training data 120, the sample ID 342 may be assigned independently of the actual identification data 144 associated with that user. For example, the sample ID 342 may have a value of "User4791" and not the actual identity of "Bob Patel". The modality label 344 indicates whether the associated image data is representative of a first modality, second modality, multimodality, and so forth.

In this illustration, training identity 302(A) includes first modality image data 202(1) and associated sample ID 342(1) and modality label 344(1), and second modality image data 204(1) and associated sample ID 342(2) and modality label 344(2). In implementations where additional modalities are used, the training data 120 for a training identity 302 may also include Mth modality image data 306(1) and associated sample ID 342(M) and modality label 344(M).

In this illustration, training identity 302(T) includes multimodal image data 112(1), and associated sample ID 342(3) and modality label 344(3). In some implementations, as mentioned above, additional modalities may be synthesized using the multimodal image data 112(1) as input.

Figure 4:
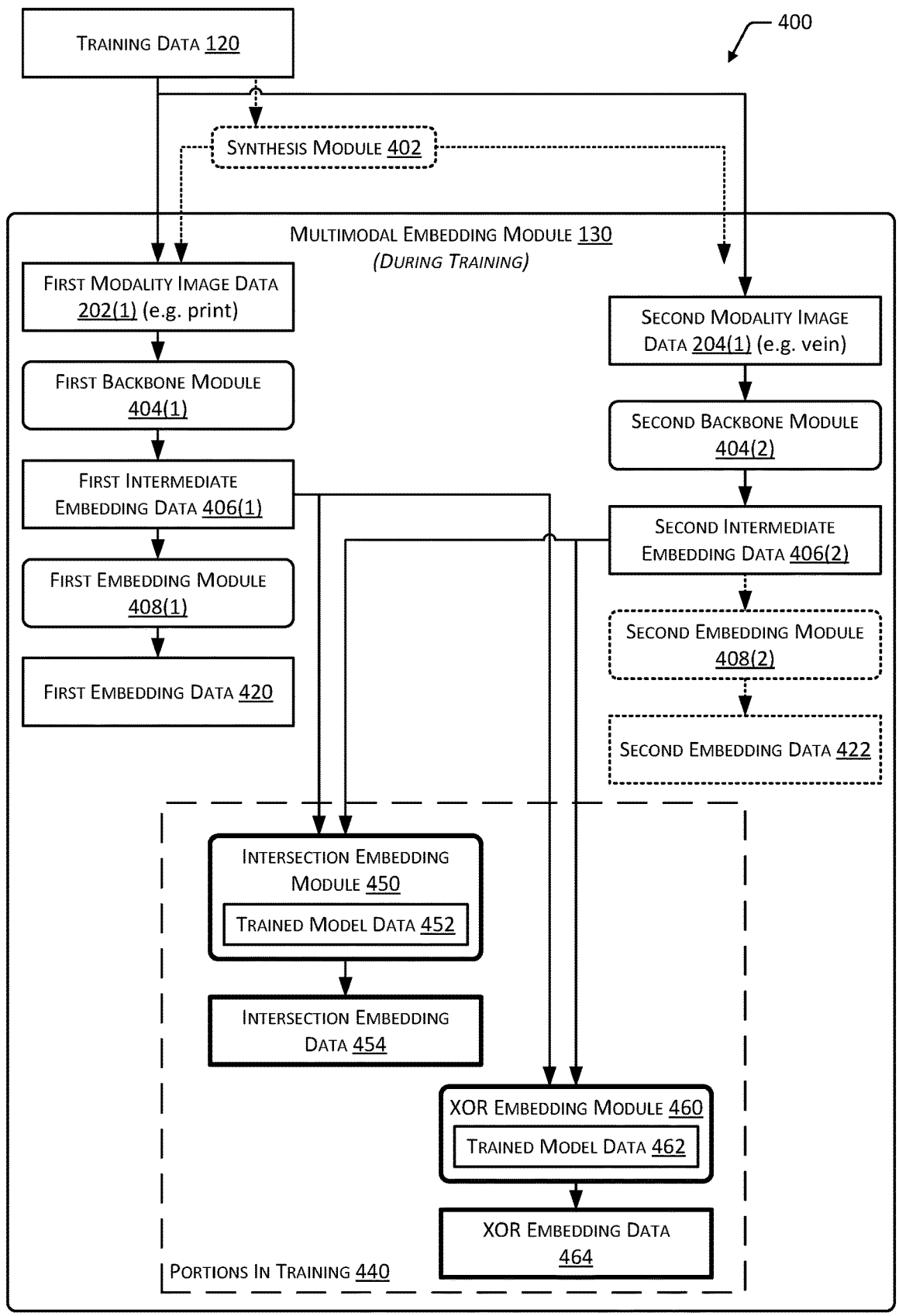
FIG. 4 illustrates a block diagram of the multimodal embedding module during training, according to some implementations.

FIG. 4 illustrates a block diagram 400 of the multimodal embedding module 130 during training, according to some implementations.

During training, the training data 120 is provided as input to the multimodal embedding module 130. In some implementations, a synthesis module 402 may be used to one or more of process a portion of the training data 120 or generate synthetic training data. The synthesis module 402 may comprise one or more generative adversarial networks (GANs). As described above, training data 120 comprising multimodal image data 112 may be processed to determine one or more of first modality image data 202 or second modality image data 204 that is based on the multimodal image data 112.

A machine learning network is used to implement the multimodal embedding module 130. The machine learning network may comprise several portions, or branches. In the implementation depicted, portions in training 440 are being trained as specified and discussed below. The remainder of the portions may have been previously trained for their respective functions. In other implementations, one or more portions of the entire machine learning network may be trained during training.

During training, the multimodal embedding module 130 may comprise a first backbone module 404(1), a second backbone module 404(2), a first embedding module 408(1), an intersection embedding module 450 and an XOR embedding module 460. In some implementations, during training the multimodal embedding module 130 may also comprise a second embedding module 408(2).

The backbone module(s) 404 comprise a backbone architecture of an artificial neural network. The backbone module 404 accepts as input the training data 120 and produces intermediate embedding data 406. In the implementation shown, the first backbone module 404(1) accepts as input the first modality image data 202 and provides first intermediate embedding data 406(1) as output. Also as shown in FIG. 4, the second backbone module 404(2) accepts as input the second modality image data 204 and provides second intermediate embedding data 406(2) as output. In some implementations, a single backbone module 404 may be used to process the training data 120 and determine intermediate embedding data 406. For example, the same backbone module 404 may be used at different times to determine the intermediate embedding data 406 for a respective input.

In one implementation the backbone module(s) 404 may utilize a neural network having at least one layer utilizing an inverted residual with a linear bottleneck. For example, MobileNetV2 implements this architecture. (See "MobileNetV2: Inverted Residuals and Linear Bottlenecks", Sandler, M. et al, 2018 IEEE/CVF Conference on Computer Vision and Pattern Recognition, 18-23 Jun. 2018.)

The first embedding module 408(1) accepts as input the first intermediate embedding data 406(1) and determines first embedding data 420. For example, the first embedding data 420 may be representative of one or more features present in the first modality image data 202. In implementations where the first backbone module 404(1) accepts as input the multimodal image data 112, the first embedding data 420 may be representative of one or more of surface features or subcutaneous features.

In some implementations, the network may comprise a multiple head network. For example, different heads may be trained to determine or utilize particular features within the training data 120. For example, the first embedding module 408(1) may include or operate in conjunction with another module that provides an additional "head" to determine particular features such as minutiae representing the particular features of friction ridges present on human skin. In another implementation, this portion may be trained to receive and utilize minutiae data determined using another system, such as a minutiae determination algorithm.

The second embedding module 408(2) accepts as input the second intermediate embedding data 406(2) and determines second embedding data 422. For example, the second embedding data 422 may be representative of one or more features present in the second modality image data 204. In implementations where the second backbone module 404(2) accepts as input the multimodal image data 112, the second embedding data 422 may be representative of one or more of subcutaneous features or surface features.

The machine learning network of the multimodal embedding module 130 includes an intersection branch as implemented by an intersection embedding module 450 and an XOR branch as implemented by an XOR embedding module 460. In some implementations this provides a joint model training framework. During training, the intersection embedding module 450 and the XOR embedding module 460 utilize respective loss functions to determine loss values. Based on these loss values, the respective portions determine trained model data 452. For example, the intersection embedding module 450 determines trained model data 452 while the XOR embedding module 460 determines trained model data 462. Some implementations of loss functions that may be used are discussed with respect to FIG. 5.

The intersection branch, as implemented by the intersection embedding module 450, processes the first intermediate embedding data 406(1) and the second intermediate embedding data 406(2) to determine intersection embedding data 454 and a loss value. For example, the intersection branch is trained such that first modality and second modality images having the same sample ID 342 value belong to the same class. As a result, after training, the intersection embedding data 454 is representative of features depicted in a first modality image and a second modality image that are labeled as having a same identity.

The XOR branch, as implemented by the XOR embedding module 460, processes the first intermediate embedding data 406(1) and the second intermediate embedding data 406(2) to determine XOR embedding data 464 for each modality being trained. Each modality of a sample ID 342 may be assigned a different class label for training on the XOR branch. The XOR embedding module 460 is trained such that first modality and second modality images with the same sample ID 342 value belong to different classes. As a result, after training, the XOR embedding data 464 is representative of features that are depicted in a particular modality and not in the other modalities. For example, the XOR embedding data 464 is associated with features that are not in both the first modality image and the second modality image.

In the implementation shown, there are two modalities in use, resulting in XOR embedding data 464 that is associated with the first modality and the second modality. For example, during training, when the first intermediate embedding data 406(1) is associated with an input image having a modality label 344 indicating the first modality, the XOR branch determines the first modality XOR embedding data 464(1). Continuing the example, when the second intermediate embedding data 406(2) is associated with an input image having a modality label 344 indicating the second modality, the XOR branch determines the second modality XOR embedding data 464(2).

During training, the loss values determined by the respective loss functions are used to determine the trained model data. For example, trained model data 452 is determined for the intersection embedding module 450 while trained model data 464 is determined for the XOR embedding module 460.

Figure 5:
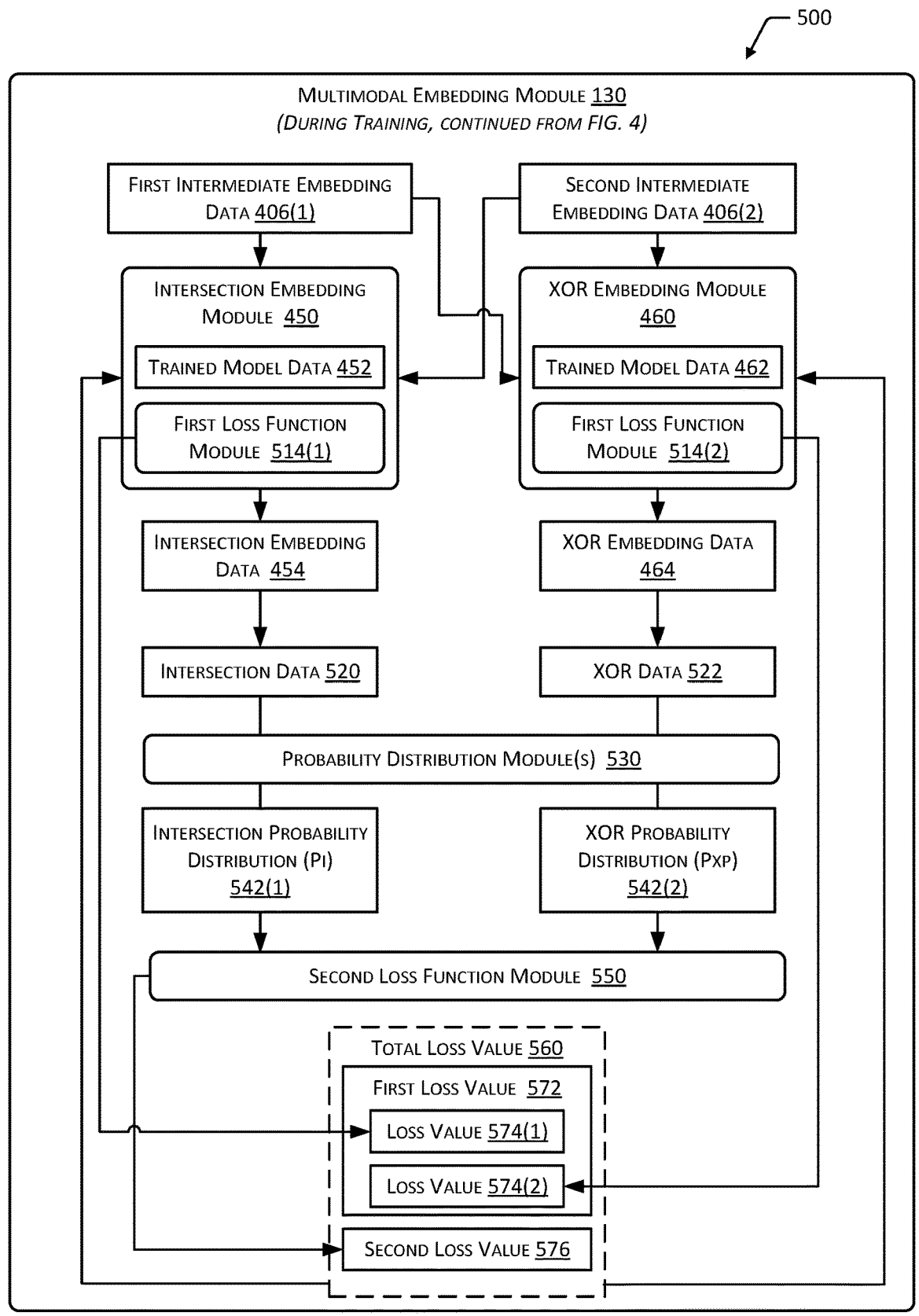
FIG. 5 illustrates a block diagram of loss functions used during training of the multimodal embedding module, according to some implementations.

FIG. 5 illustrates at 500 a block diagram of the portions in training 440 and their associated loss functions used during training of the multimodal embedding module 130, according to some implementations. As described with respect to FIG. 4, training may be performed to train the intersection embedding module 450 and the XOR embedding module 460, with the remaining modules of the multimodal embedding module 130 not being trained.

The intersection embedding module 450 includes a first loss function module 514(1). The XOR embedding module 460 includes another first loss function module 514(2). The first loss function modules 514(1) and 514(2) determine loss values 574. The branches utilize the label data 340 during training. The loss values 574 may also be provided to the second loss function module 550.

In one implementation, the first loss function module 514 may utilize a hyperspherical loss function as shown with regard to equations 1 and 2. In other implementations, other loss functions may be used. For example, other functions such as Softmax, Cosine, AM-Softmax, Arcface, large margin cosine loss, and so forth may be used.

The hyperspherical loss (HSL) function minimizes L which is the sum of a cross-entropy term, and a regularization term to regularize the confidence score (weighted by $\lambda$). $W_j$ denotes a classifier weight for $j^{th}$ class. C is the total number of training classes. M is the minibatch size. $\hat{W}$ and $\hat{x}$ are the unit-normalized form of W and x respectively. Also in these equations, $x_i$ (embedding vector of input i) and $s_i$ are both outputs of the respective modules such as the intersection embedding module 450 and the XOR embedding module 460, where $s_i$ is used only during training.

$$L = -\frac{1}{M}\sum_{i=1}^{M}\left(\log p_i - \lambda s_i^2\right) \quad (1)$$

$$p_i = \frac{e^{s_i\left(\hat{W}_{y_i}^T \hat{x}_i - m\right)}}{e^{s_i\left(\hat{W}_{y_i}^T \hat{x}_i - m\right)} + \sum_{j=1, j \neq y_i}^{C} e^{\hat{W}_j^T \hat{x}_i}} \quad (2)$$

During training the intersection embedding module 450 may determine the intersection embedding data 454, one or more parameters of the intersection embedding data 454, and so forth. For example, the one or more parameters may comprise weights for one or more classes. The intersection embedding data 454 and associated one or more parameters may be stored as intersection data 520. During training the XOR embedding module 460 may determine a plurality of the first modality XOR embedding data 464(1) and the second modality XOR embedding data 464(2), and one or more parameters of the XOR embedding data 464. The XOR embedding data 464 and associated one or more parameters may be stored as XOR data 522. Once training is complete one or more of the intersection data 520 or XOR data 522 may be deleted or otherwise discarded.

A probability distribution module 530 processes the data 520-522 to determine a set of probability distributions. The intersection data 520 is processed to determine an intersection probability distribution (Pi) 542(1). The XOR data 522 is processed to determine an XOR probability distribution (Pxp) 542(2).

A second loss function module 550 accepts the probability distributions 542 and determines a second loss value 576. In one implementation, the second loss function module 550 may implement a Jensen-Shannon Divergence (JSD) loss function. The JSD loss function measures similarity between two probability distributions. For two probability distributions P and Q JSD may be defined in one implementation with the following equation:

$$JSD(P\|Q)=0.5*(D)P\|M)+D(Q\|M)) \quad (3)$$

where M=(P+Q)/2, D is the Kullback-Leibler Divergence (KLD)

Unlike KLD, JSD(P∥Q)=JSD(Q∥P), which allows JSD to be used as a distance metric for probability distributions. It is desired that the values of the probability distributions 542 of incorrect classes for the intersection (I) and XOR (Xp) have values that differ from one another, implicitly ensuring decorrelation.

Given an image x for identity c, the joint model training framework described above and using a first loss function such as hyperspherical loss, determines the set of probability distributions 542: the intersection probability distribution (Pi) 542(1) and the XOR probability distribution (Pxp) 542(2). For example, the loss values 574 determined by the first loss function module(s) 514 may be used as input to the JSD loss function. These probability distributions are N dimensional, where N is the number of training identities 302(N). This can be expressed with the following equations:

$$Pi=[pi\_1, pi\_2, \ldots, pi\_N] \quad (4)$$

$$Pxp=[pxp\_1, pxp\_2, \ldots, pxp\_N] \quad (5)$$

From each of these probability distributions 542, the entry corresponding to the correct identity c is removed, and the vector is normalized to get (N−1) dimensional probability distribution of incorrect classes $Pi\_n$, $Pxp\_n$, as shown in the following equations:

$$Pi\_n = [pi\_1, pi\_2, \ldots, pi\_c-1, pi\_c+1, \ldots, pi\_N]/(1-pi\_c) \quad (6)$$

$$Pxp\_n = [pxp\_1, pxp\_2, \ldots, pxp\_c-1, pxp\_c+1, \ldots pxp\_N]/(1-pxp\_c) \quad (7)$$

The JSD loss then minimizes the following equation:

$$JSD\_Loss = -1.0*(JSD(Pi\_n \| Pxp\_n)) \quad (8)$$

A total loss value 560 is calculated based on the first loss values 572 and the second loss value 576. For example, the total loss value 560 may be calculated using the following equation:

$$Total\ Loss = Hyperspherical\_loss + loss\_weight * JSD\_loss \quad (9)$$

The total loss value 560 may then be provided to the one or more of the intersection embedding module 450 or the XOR embedding module 460 for subsequent iterations during training. As a result of training, the trained model data 452 and 462, respectively, is determined. For example, the trained model data may comprise weight values, bias values, threshold values, and so forth that are associated with particular nodes or functions within the multimodal embedding module 130. Once trained, the multimodal embedding module 130 may be used to determine embedding data 132 for subsequent use.

Figure 6:
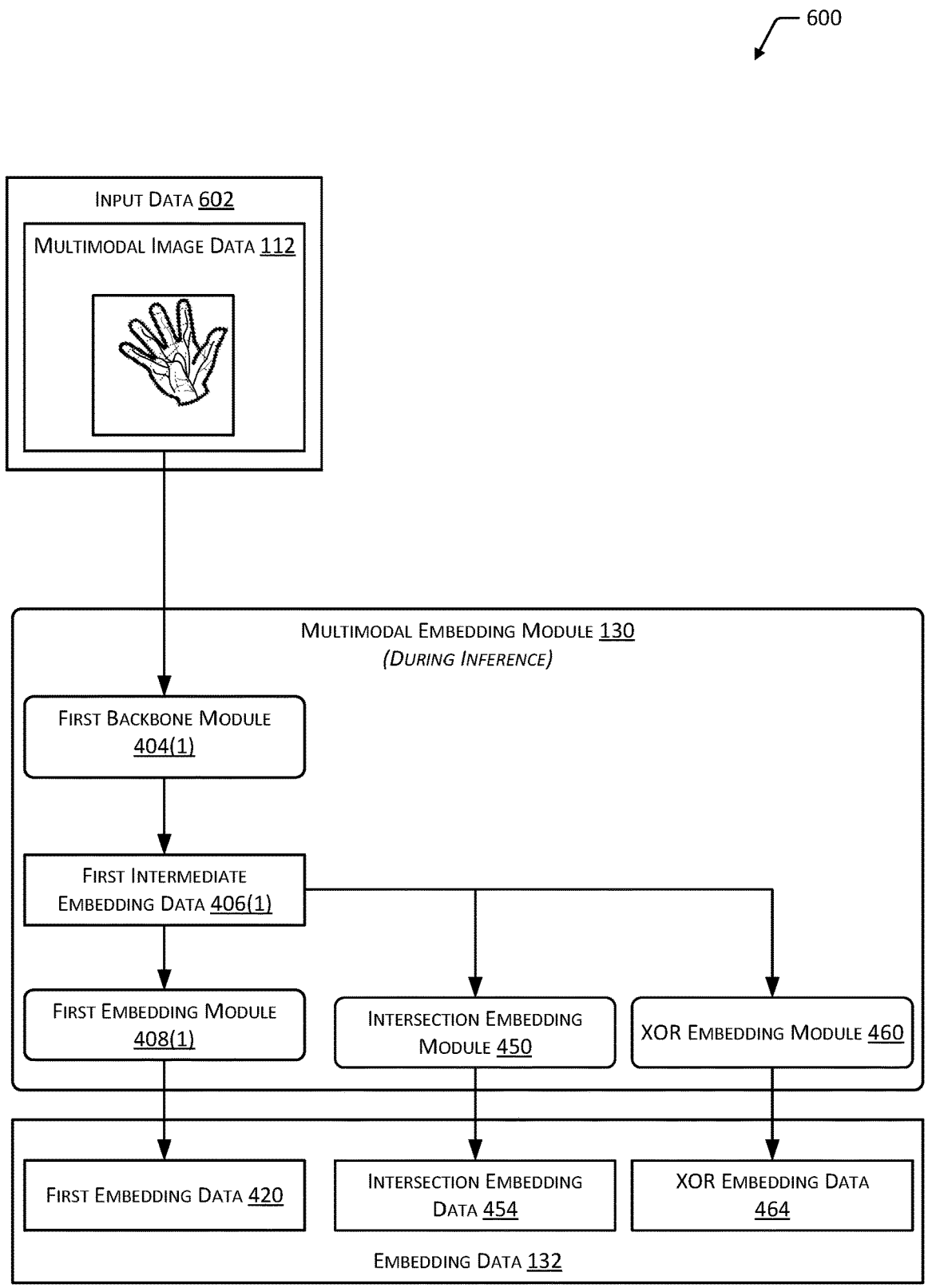
FIG. 6 illustrates a block diagram of the multimodal embedding module during inference, according to some implementations.

FIG. 6 illustrates at 600 a block diagram of the multimodal embedding module 130 during inference, according to some implementations.

Once the portions in training 440 have been trained as described above, during inference a subset of the machine learning network may be used. In the implementation depicted here, the multimodal embedding module 130 during inference may comprise the first backbone module 404(1), the first embedding module 408(1), the intersection embedding module 450, and the XOR embedding module 460. During operation, input data 602 such as multimodal image data 112 is provided to the trained multimodal embedding module 130. The first backbone module 404(1) may process the input data 602 to determine the first intermediate embedding data 406(1). The first intermediate embedding data 406(1) is processed by the first embedding module 408(1) to determine the first embedding data 420. The first intermediate embedding data 406(1) is processed by the intersection embedding module 450 to determine the intersection embedding data 454. The first intermediate embedding data 406(1) is processed by the XOR embedding module 460 to determine the XOR embedding data 464.

The embedding data 132 may comprise one or more of the first embedding data 420, the intersection embedding data 454, or the XOR embedding data 464. The resulting embedding data 132 may be used in subsequent processes, such as enrollment, identification, and so forth.

In addition to those mentioned above, once trained, a deployed implementation of the multimodal embedding module 130 may omit one or more other modules that are used during training and not during inference. For example, the multimodal embedding module 130 may omit the first loss function modules 514, the probability distribution module 530, the second loss function module 550, and so forth.

Figure 7:
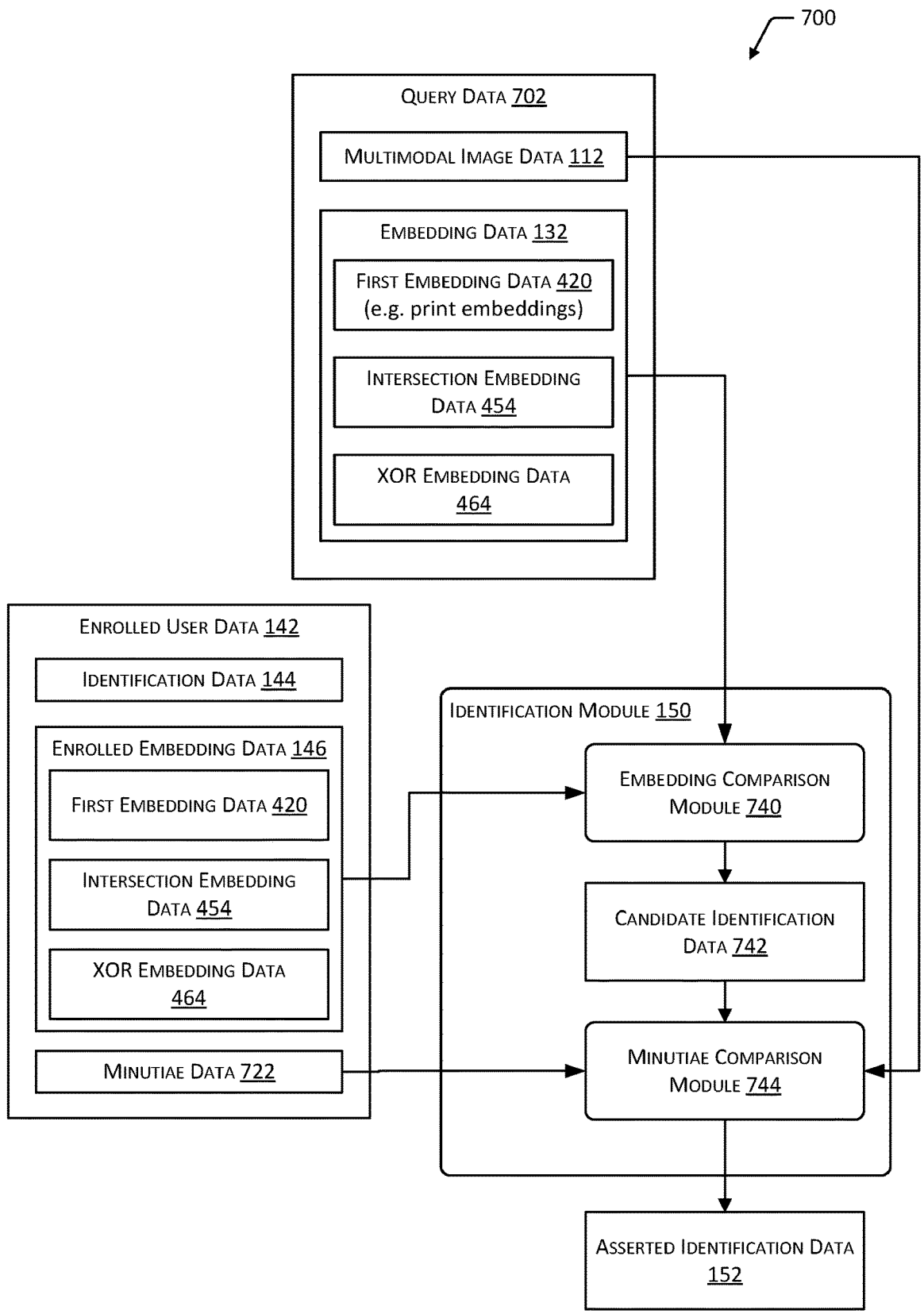
FIG. 7 illustrates a block diagram of the identification module determining asserted identification data, according to some implementations.

FIG. 7 illustrates at 700 a block diagram of the identification module 150 determining asserted identification data 152, according to some implementations. The identification module 150 may process query data 702. The query data 702 may comprise the resulting embedding data 132 determined by the trained multimodal embedding module 130. In some implementations, the query data 702 may also comprise the multimodal image data 112, or information based thereon.

During enrollment, the enrollment module 140 (not shown here) is used to acquire multimodal image data 112(1) for a user "Alex". This multimodal image data 112(1) is processed by the (trained) multimodal embedding module 130 to determine the resulting embedding data 132(1) representative of Alex in one or more embedding spaces. As mentioned earlier, the embedding data 132 may comprise one or more of the first embedding data 420, the intersection embedding data 454, or the XOR embedding data 464. This embedding data 132(1) may be stored in the enrolled user data 142 as enrolled embedding data 142 and associated with identification data 144, such as an account number, name, and so forth.

In some implementations, additional information may also be determined and stored. For example, the multimodal image data 112 may be processed with a minutiae determination algorithm to determine minutiae data 722. For example, the minutiae determination algorithm may utilize one or more deterministic algorithms to determine minutiae data 722 that is representative of particular features of friction ridges on human skin. In some implementations, the minutiae data 722 determined during enrollment may be stored in the enrolled user data 142 and is associated with the identification data 144 of that user.

During enrollment, the identification module 150 may be used to query the enrolled user data 142 and determine if the user being enrolled has previously enrolled. If the user is deemed to have been previously enrolled, additional enrollment may be denied.

Once a user has been enrolled, the system 100 may be queried to assert an identity of the user. During a query operation the query data 702 is provided and processed. A query multimodal image data 112 may be processed by the (trained) multimodal embedding module 130 to determine query embedding data 132.

The identification module 150 may comprise an embedding comparison module 740 that compares the query embedding data 132 to the previously stored enrolled embedding data 146 to candidate identification data 742. In one implementation, the candidate identification data 742 may comprise the top k (where k is a nonzero integer) user identifiers that are associated with enrolled embedding data 146 that are closest, in the embedding space(s), to the query embedding data 132. In one implementation, the identification data 144 associated with the enrolled embedding data 146 that is closest in the embedding space(s) may be deemed to be the asserted identification data 152.

The embedding comparison module 740 may perform a plurality of comparisons among the various embedding spaces. For example, a comparison of the query first embedding data 420 may be performed to determine a first set of closest first embeddings in the enrolled user data 142. In another example a comparison of the query intersection embedding data 454 may be performed to determine a second set of closest intersection embeddings in the enrolled user data 142. In yet another example a comparison of the query XOR embedding data 464 may be performed to determine a third set of closest XOR embeddings in the enrolled user data 142. These comparisons may be assessed to determine one or more enrolled identities that are closest. For example, the top k entries may comprise the top k entries that are less than a maximum distance in all of the respective embedding spaces.

In the implementation depicted here, additional techniques may be used to select which identity in the candidate identification data 742 is to be selected as the asserted identification data 152. For example, the candidate identification data 742 may comprise a top 10 possible identities. The minutiae data 722 from these top 10 identities may be compared to the query minutiae data. Based on this comparison, a single identity may be selected as the asserted identification data 152.

The identification module 150 may comprise a minutiae comparison module 744. The minutiae comparison module 744 may process the multimodal image data 112 in the query data 702 and determine query minutiae data. This may be compared to the previously stored minutiae data 722 associated with the identities included in the candidate identification data 742.

Figure 8:
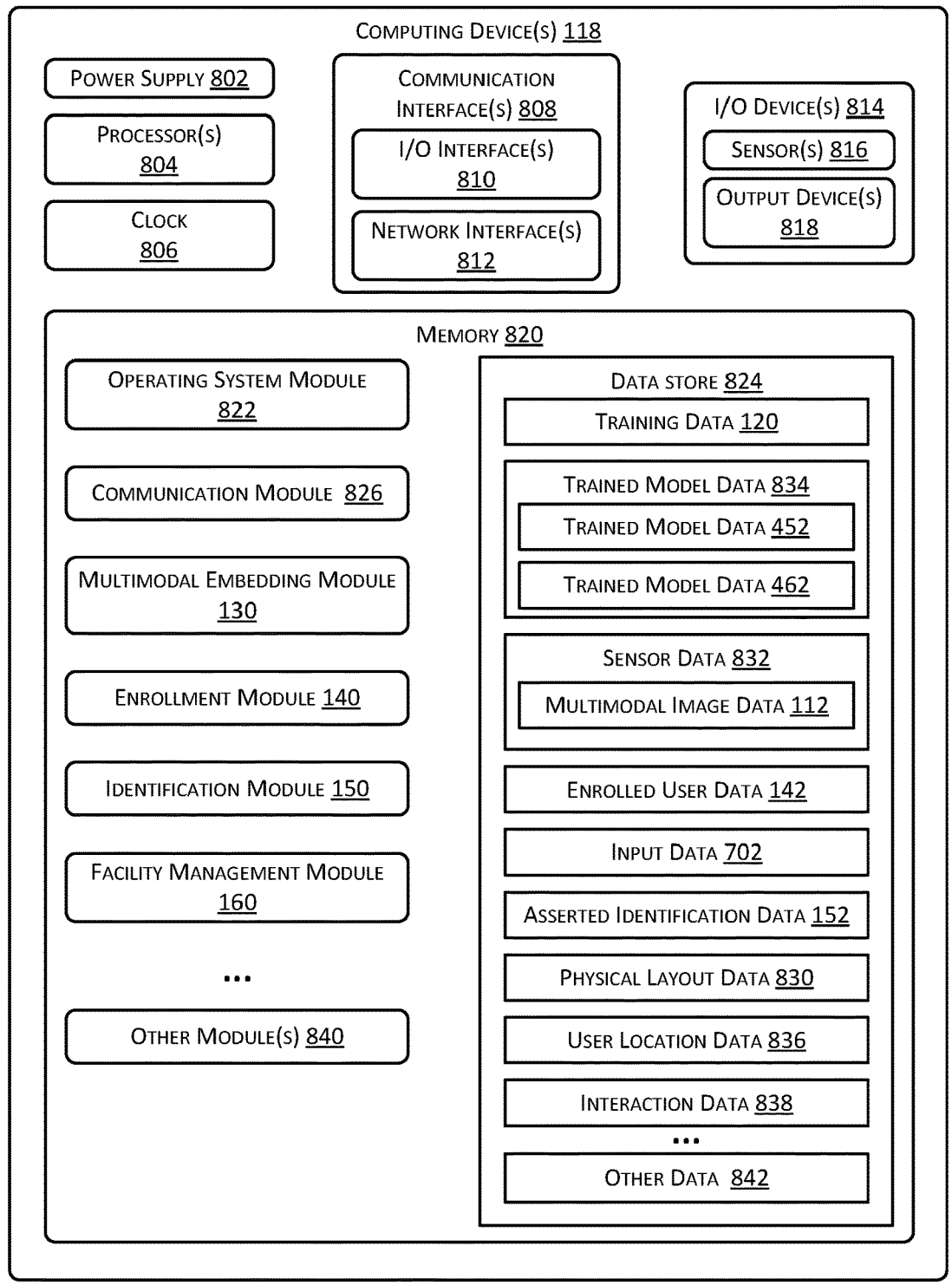
FIG. 8 is a block diagram of a computing device to implement the system, according to some implementations.

FIG. 8 is a block diagram 800 of a computing device 118 to implement the system 100, according to some implementations. The computing device 118 may be within the scanner 104, may comprise a server, and so forth. The computing device 118 may be physically present at the facility, may be accessible by a network, or a combination of both. The computing device 118 does not require end-user knowledge of the physical location and configuration of the system that delivers the services. Common expressions associated with the computing device 118 may include "embedded system", "on-demand computing", "software as a service (SaaS)", "platform computing", "network-accessible platform", "cloud services", "data centers", and so forth. Services provided by the computing device 118 may be distributed across one or more physical or virtual devices.

One or more power supplies 802 may be configured to provide electrical power suitable for operating the components in the computing device 118. The one or more power supplies 802 may comprise batteries, capacitors, fuel cells, photovoltaic cells, wireless power receivers, conductive couplings suitable for attachment to a power source such as provided by an electric utility, and so forth. The computing device 118 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction with a particular point in time.

The computing device 118 may include one or more communication interfaces 808 such as input/output (I/O) interfaces 810, network interfaces 812, and so forth. The communication interfaces 808 enable the computing device 118, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 816, keyboard, mouse, scanner, and so forth. The I/O devices 814 may also include output devices 818 such as one or more of a display device, printer, audio speakers, and so forth. In some embodiments, the I/O devices 814 may be physically incorporated with the computing device 118 or may be externally placed. The sensors 816 may comprise the camera 108, smartcard readers, touch sensors, microphones, and so forth.

The network interfaces 812 may be configured to provide communications between the computing device 118 and other devices, such as routers, access points, and so forth. The network interfaces 812 may include devices configured to couple to personal area networks (PANS), local area networks (LANs), wireless local area networks (WLANS), wide area networks (WANs), and so forth. For example, the network interfaces 812 may include devices compatible with Ethernet, Wi-Fi, Bluetooth, and so forth.

The computing device 118 may also include one or more buses or other internal communications hardware or software that allow for the transfer of data between the various modules and components of the computing device 118.

As shown in FIG. 8, the computing device 118 includes one or more memories 820. The memory 820 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 820 provides storage of computer-readable instructions, data structures, program modules, and other data for the operation of the computing device 118. Several functional modules are shown stored in the memory 820, although the same functionality may alternatively be implemented in hardware, firmware, or as a system on a chip (SoC).

The memory 820 may include at least one operating system (OS) module 822. The OS module 822 is configured to manage hardware resource devices such as the I/O interfaces 810, the I/O devices 814, the communication interfaces 808, and provide various services to applications or modules executing on the processors 804. The OS module 822 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 826 may be configured to establish communications with the computing device 118, servers, other computing devices 106, or other devices. The communications may be authenticated, encrypted, and so forth.

Also stored in the memory 820 may be a data store 824 and one or more of the following modules. These modules may be executed as foreground applications, background tasks, daemons, and so forth. The data store 824 may use a flat file, database, linked list, tree, executable code, script, or other data structure to store information. In some implementations, the data store 824 or a portion of the data store 824 may be distributed across one or more other devices including other computing devices 106, network attached storage devices, and so forth.

The data store 824 may store one or more of the training data 120, trained model data 834 such as the trained model data 452 and the trained model data 462, enrolled user data 142, query data 702, and so forth. The memory 820 may store the multimodal embedding module(s) 130, the identification module 150, the facility management module 160, and so forth.

In some implementations, the multimodal image data 112 may be temporarily stored during processing by the multimodal embedding module 130. For example, the scanner 104 may acquire the multimodal image data 112, determine embedding data 132 based on the multimodal image data 112, and then erase the multimodal image data 112. The resulting embedding data 132 may then be sent to a server or other computing device 118 to perform enrollment, for comparison to assert an identity, and so forth.

The facility management module 160 may perform various functions, such as tracking items between different inventory locations, to and from carts, generating restocking orders, directing operation of robots within the facility, using the asserted identification data 152 to associate a particular user identity with a user in the facility, and so forth. During operation, the facility management module 160 may access sensor data 832 such as multimodal image data 112, or data from other sensors 816.

Information used by the facility management module 160 may be stored in the data store 824. For example, the data store 824 may be used to store physical layout data 830, sensor data 832, asserted identification data 152, user location data 836, interaction data 838, and so forth. For example, the sensor data 832 may comprise the multimodal image data 112 obtained from a scanner 104 associated with the facility.

The physical layout data 830 may provide information indicative of where scanners 104, cameras, weight sensors, antennas for radio receivers, inventory locations, and so forth are within the facility with respect to one another. For example, the physical layout data 830 may comprise information representative of a map or floor plan of the facility with relative positions of gates with scanners 104 and inventory locations.

The facility management module 160 may generate the user location data 836 that is indicative of the location of the user within the facility. For example, the facility management module 160 may use image data obtained by the cameras to determine a location of the user. In other implementations, other techniques may be used for determining the user location data 836. For example, data from a smart floor may be used to determine the location of the user.

The identification data 144 may be associated with user location data 836. For example, the user enters the facility and has their hand 102 scanned by the scanner 104, resulting in asserted identification data 152 that is associated with their time of entry and the scanner 104 location. The user location data 836 indicative of a path of a user that begins at the scanner 104 location at the time of entry may be associated with the user identifier in the asserted identification data 152.

Based on the user location data 836 and the interaction data 838, a particular interaction may be associated with an account of a particular user. For example, if the user location data 836 indicates that the user is present in front of inventory location 892 at time 09:02:02 and the interaction data 838 indicates a pick of a quantity of one item from an area on inventory location 892 at 09:04:13, the user may be billed for that pick.

The facility management module 160 may use the sensor data 832 to generate the interaction data 838. The interaction data 838 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 160 may generate interaction data 838 that indicates what item the user picked from a particular lane on a shelf, and then use this interaction data 838 to adjust the count of inventory stowed at that lane. The interaction data 838 may then be used to bill an account associated with the user identifier that is associated with the user who picked the item.

The facility management module 160 may process the sensor data 832 and generate output data. For example, based on the interaction data 838, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 840 may also be present in the memory 820 as well as other data 842 in the data store 824. For example, a billing module may use the interaction data 838 and the asserted identification data 152 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the asserted identification data 152. In another example, a robot may incorporate a scanner 104. The robot may use the asserted identification data 152 to determine whether to deliver a parcel to the user, and based on the asserted identification data 152, which parcel to deliver.

While the input to the system 100 is discussed with respect to image data, the system may be used with other types of input. For example, the input may comprise data acquired from one or more sensors 816, data generated by another system, and so forth. For example, instead of image data produced by the camera 108, the input to the system 100 may comprise an array of data. Other modalities may also be used. For example, the first modality may be visible light, the second modality may be sonar, and so forth.

While the system 100 is discussed with respect to processing biometric data, the system may be used with other types of data. For example, the input may comprise satellite weather imagery, seismic data, product images, data indicative of chemical composition, and so forth. For example, instead of image data produced by the camera 108, the input to the system 100 may comprise an array of data.

FIGS. 9A-9D depict some implementations of the scanner 104 that may be used to acquire multimodal image data 112. It is understood that other implementations are also possible.

Figure 9A:
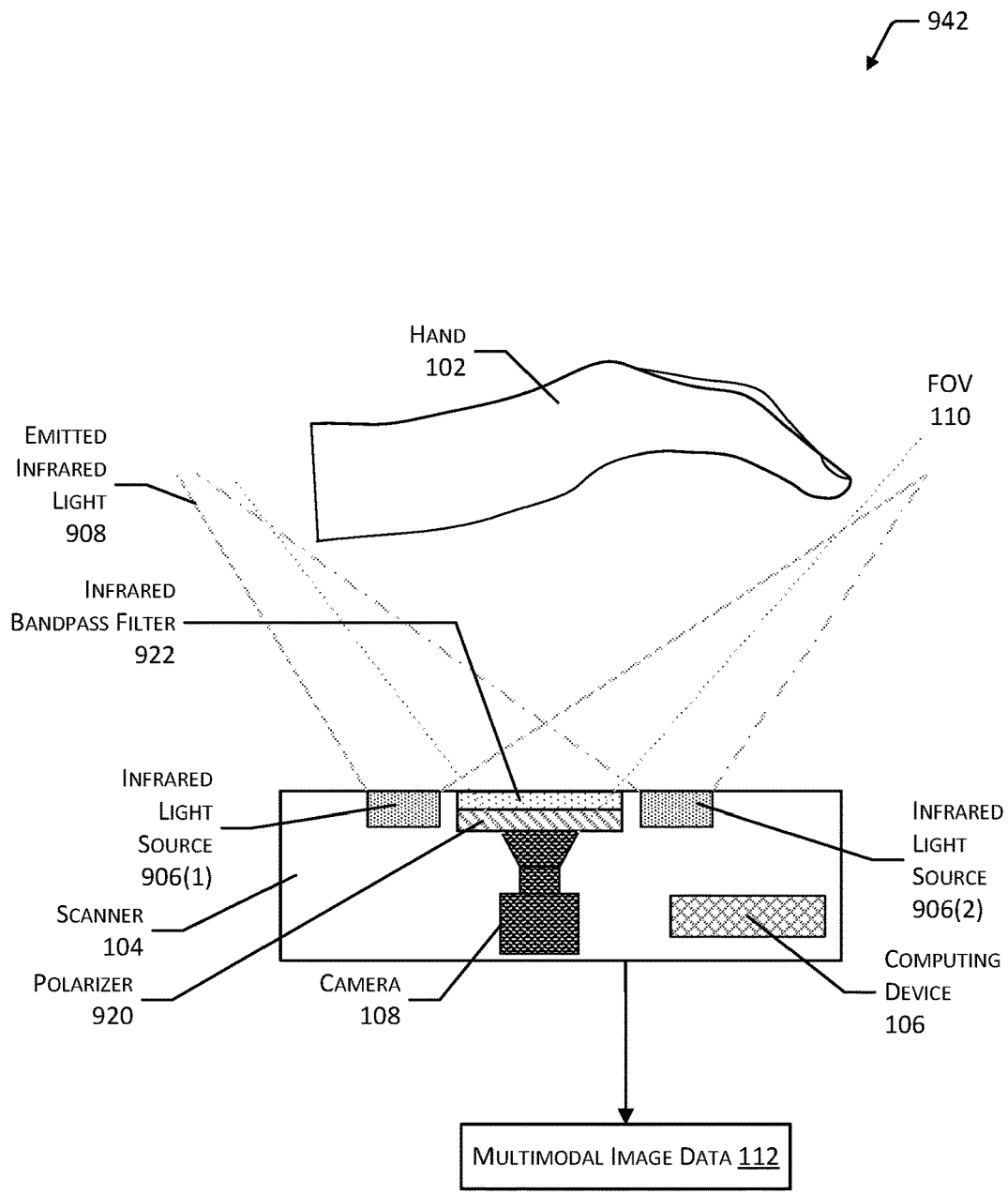
FIGS. 9A-9D depict some implementations of a scanner to acquire multimodal image data.

FIG. 9A shows a first implementation 942 of the scanner 104. The hand 102 of the user is shown positioned above the scanner 104. In the implementations depicted here, the scanner 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, bacteria, viruses, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire the multimodal image data 112.

The scanner 104 includes at least one camera 108. The camera 108 comprise detectors that are responsive to at least the IR light being used. For example, the camera 108 may comprise a charge coupled device (CCD), complementary metal oxide semiconductor (CMOS), microbolometer, and so forth. The camera 108 may be able to generate imagery at various frame rates. For example, the camera 108 may be able to generate an image every 1/20 of a second or faster, having a frame rate of 20 frames per second (FPS). An integration time (or exposure time) of the camera 108 specifies the amount of time that photons are measured by the detectors to generate a single image. As the integration time decreases, the system may be less prone to blurring due to motion of the hand 102.

The scanner 104 may include one or more infrared (IR) light sources 906 to generate emitted infrared light 908. The emitted IR light 908 may comprise randomly polarized infrared light. For example, a first IR light source 906(1) may comprise a first IR light emitting diode (LED) and a second IR light source 906(2) comprising a second IR LED, are shown. In other implementations other devices may be used to generate infrared light. In some implementations, the wavelength of the emitted IR light 908 may be 850 nanometers (nm).

The field of view (FOV) 110 indicates a region which is illuminated by the IR light sources 906 and from which images from the camera 108 may be obtained.

The scanner 104 in implementation 942 comprises a polarizer 920 and an IR bandpass filter 922 arranged within the optical path of the camera 108. The polarizer 920 results in the infrared light captured by the camera 108 to substantially exhibit a first polarization. The polarizer 920 may comprise a filter that is substantially transmissive to light of a particular polarization, while substantially absorbing or reflecting light with another polarization. The polarization may be one or more of linear or circular. In some implementations, the polarizer 920 may be employed to reduce or eliminate the effects of ambient light, glare, and so forth. In other implementations, the polarizer 920 may be employed to enhance the details associated with a particular modality in the multimodal image data 112.

The polarizer 920 may comprise a dichroic material or structure that passes light with a linear polarization. For example, the polarizer 920 may comprise aligned polyvinylene chains, silver nanoparticles embedded in a transparent substrate such as glass, and so forth. In other implementations, other polarization devices may be used, including but not limited to wire-grid polarizers, beam-splitting polarizers, quarter-wave plates, liquid crystals, photoelastic modulators, and so forth. For example, the photoelastic modulator may comprise a device that is controlled by an electrical signal which drives a piezoelectric transducer to vibrate a half wave resonant bar, such as fused silica. By changing the frequency of the signal, the frequency of the vibration produced by the transducer is changed, and the polarization of light through the resonant bar may be selected.

The IR bandpass filter 922 results in the light passed to the camera 108 being infrared light having wavelengths that are within the bandpass of the IR bandpass filter 922. For example, the IR bandpass filter 922 may pass light with a wavelength between 810 and 890 nm. The IR bandpass filter 922 may be placed in the optical path of the camera 108 at various points. For example, the IR bandpass filter 922 may be placed in front of the polarizer 920 as shown here, behind the polarizer 920, behind a lens in the camera 108, and so forth. In some implementations the polarizer 920 and the IR bandpass filter 922 may be a single device.

In some implementations, a plurality of IR light sources 906 may be arranged at different locations in the scanner 104 relative to the camera 108. For example, four IR light sources 906 may be arranged with one IR light source 906 at each corner of a square that is centered on the camera 108. In another implementation, the IR light sources 906 may form a ring around the camera 108.

During operation, a computing device 106 or controller of the scanner 104 may operate the IR light sources 906 individually or in groups to produce illumination that is either uniform or from a particular direction at different times. For example, during acquisition of multimodal image data 112, the IR light sources 906 may be controlled to be all on during acquisition of one image at a first time. At a second time selected IR light sources 906, such as those in a particular corner of the square, may be controlled to be on during acquisition of another image at a second time. By selectively illuminating the hand 102, external characteristics of the hand 102 such as ridges or creases may be enhanced due to shadow or other effects. For example, the computing device 106 may be configured to acquire one image using all IR light sources 906, and additional images each using one of four IR light sources 906 each at a different location with respect to the camera 108.

In some implementations the computing device 106 may execute a trained multimodal embedding module 130. The scanner 104 may acquire and send the multimodal image data 112, the embedding data 132, and so forth to the computing device 118.

In some implementations a polarized light source may be used, and the polarizer 920 adjacent to the camera 108 omitted. In a first example, a polarizer 920 may be placed in an optical path of the IR light source 906, such that the emitted infrared light 908 that is emitted to illuminate the FOV 110 has a first polarization. In another example, a quantum dot may emit IR light with a particular polarization. Likewise, in some implementations the camera 108 may include a detector that is sensitive to, or provides information indicative of, polarization of captured light, and the polarizer 920 omitted.

In some implementations, ambient infrared light may be used to provide at least a portion of, or all of, the illumination of the FOV 110. One or more external surfaces of the scanner 104 may be reflective to at least the infrared light. For example, an upper surface of the scanner 104 may be reflective, allowing overhead ambient infrared light to be reflected and illuminate at least a portion of the FOV 110.

Figure 9B:
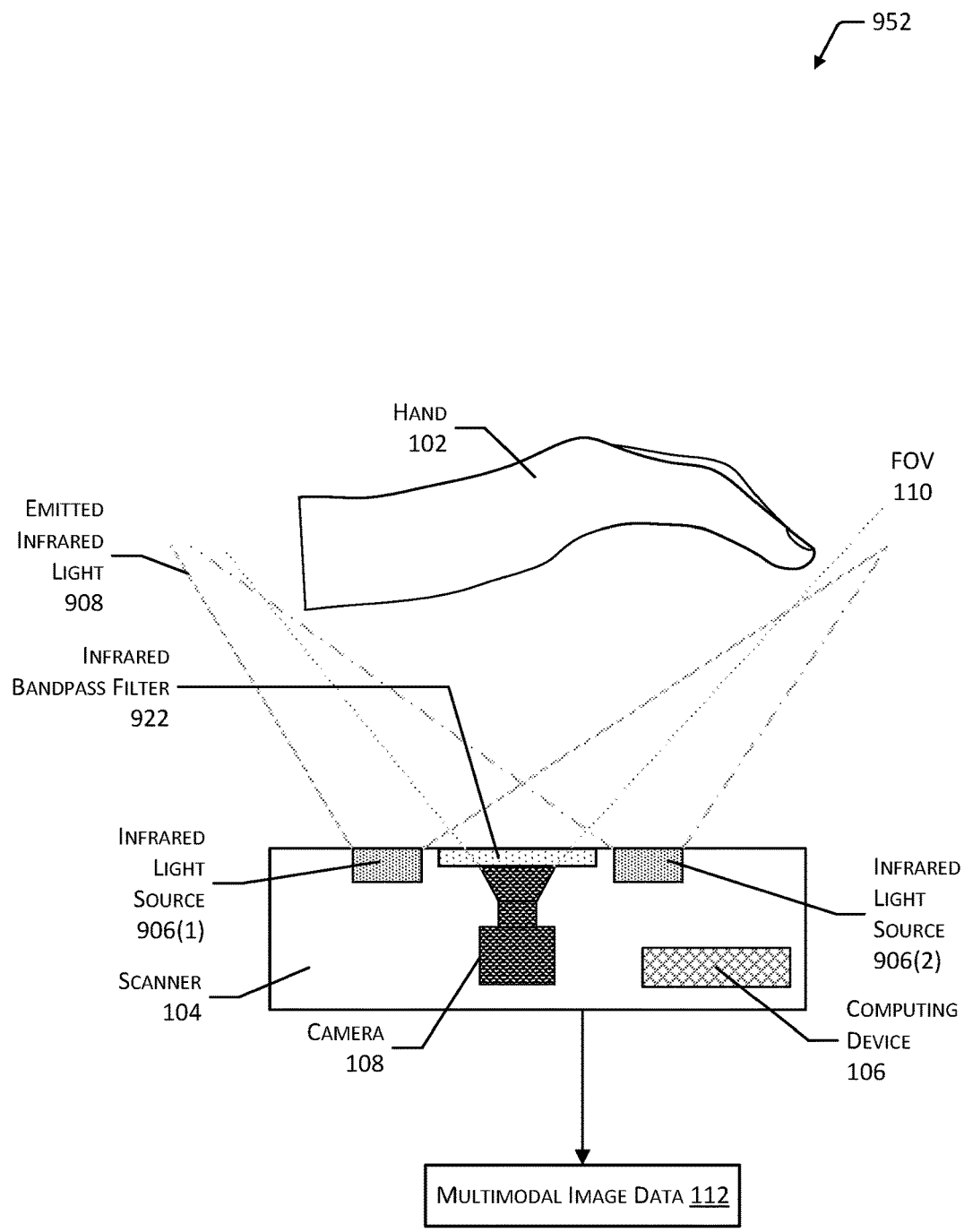

FIG. 9B shows a second implementation 952 of the scanner 104. The hand 102 of the user is shown positioned above the scanner 104. In this implementation, the scanner 104 comprises the camera 108, an IR bandpass filter 922 in the optical path of the camera 108, and IR light sources 906. In this second implementation 952, the polarizer 920 is omitted. The emitted infrared light 908 generated by the IR light sources 906 and ambient light may be randomly polarized.

Figure 9C:
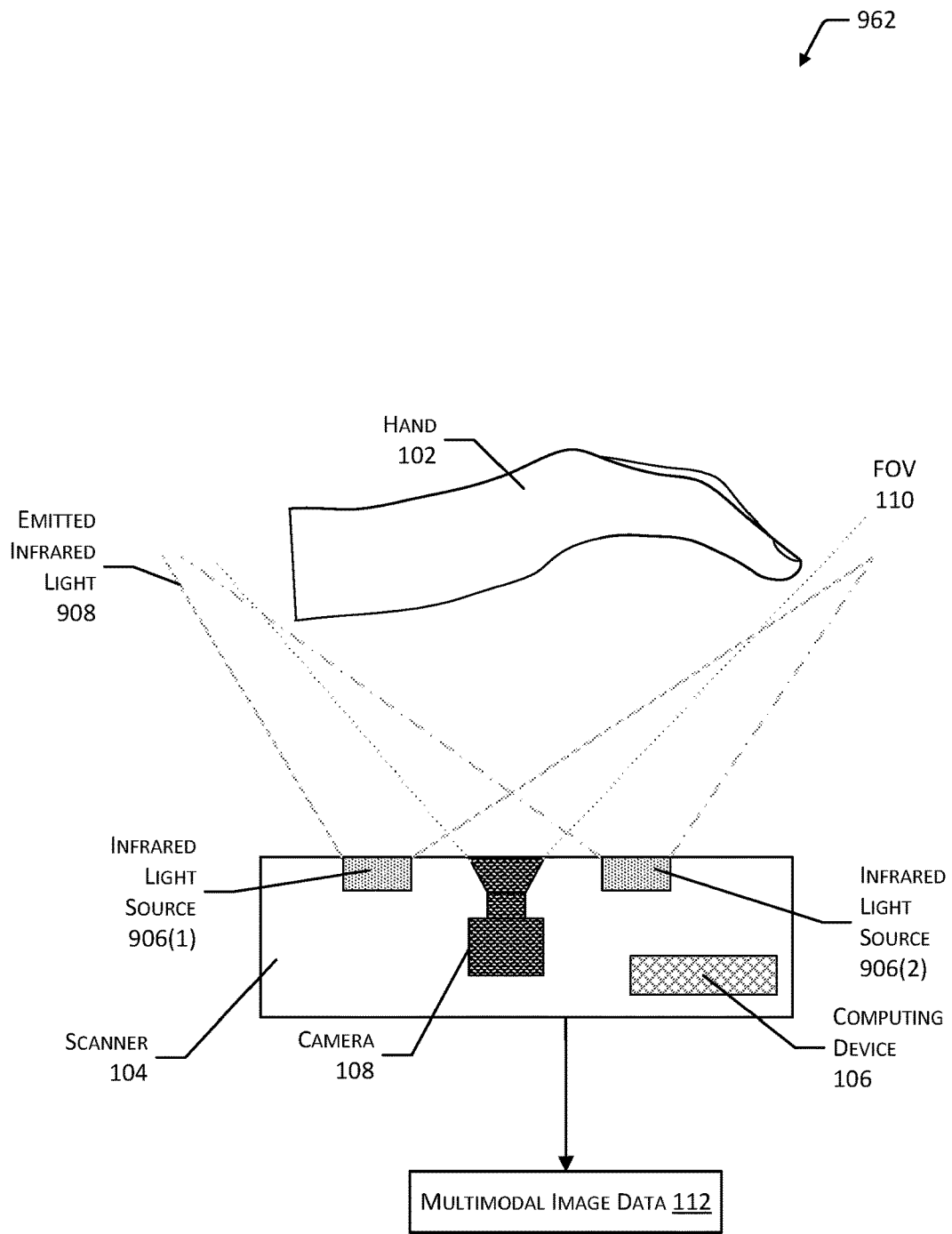

FIG. 9C shows a third implementation 962 of the scanner 104. The hand 102 of the user is shown positioned above the scanner 104. In this implementation, the scanner 104 comprises the camera 108 and IR light sources 906. In this third implementation 962, the polarizer 920 and the IR bandpass filter 922 are omitted. The emitted infrared light 908 generated by the IR light sources 906 or other light sources, including ambient light, may be randomly polarized.

Figure 9D:
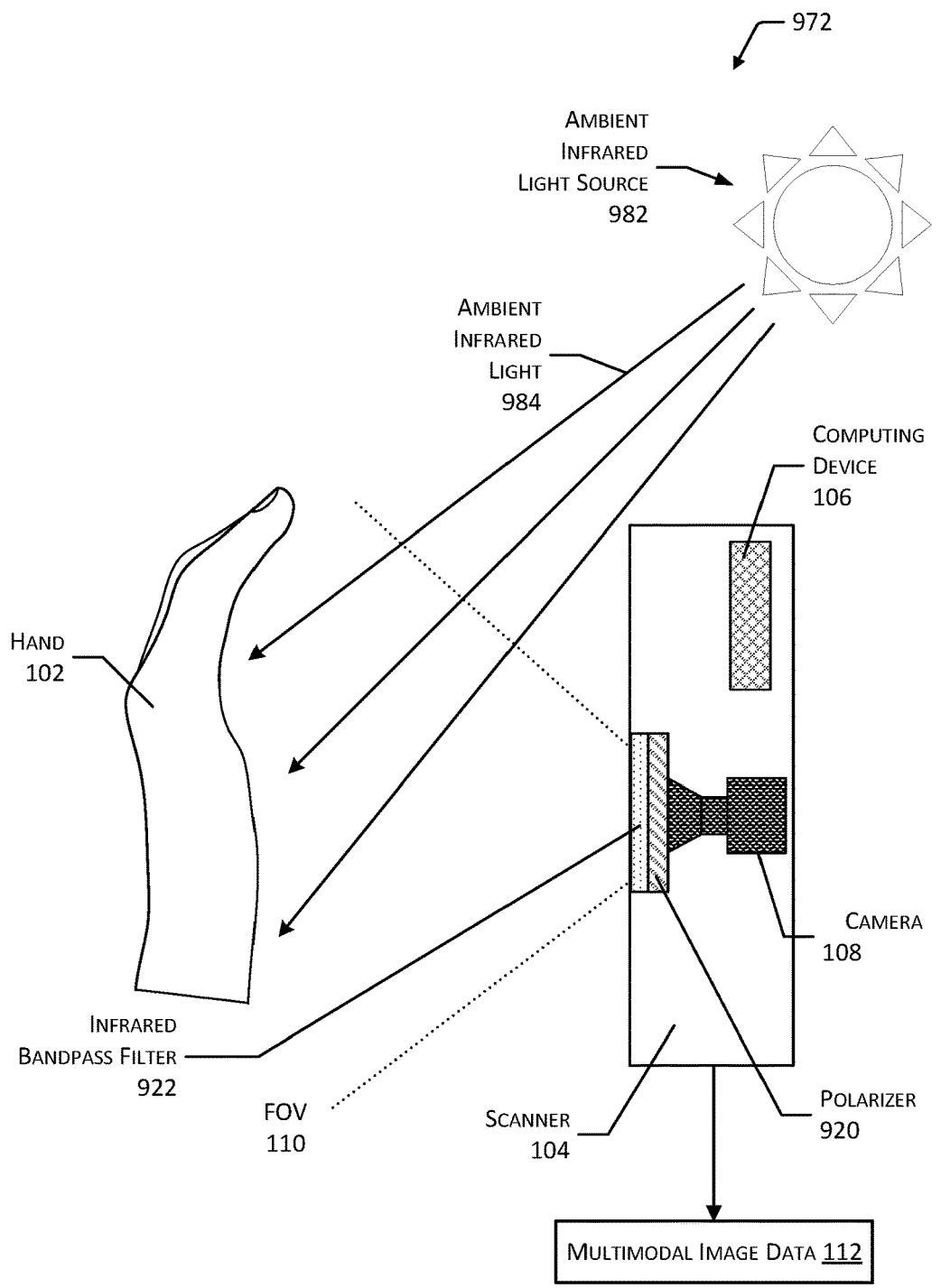

FIG. 9D shows a fourth implementation 972 of the scanner 104. The hand 102 of the user is shown positioned to the left the scanner 104. The hand 102 is illuminated by an ambient infrared light source 982 that is emitting ambient infrared light 984. The ambient infrared light 984 may be randomly polarized. In this implementation, the scanner 104 comprises the camera 108, the polarizer 920 and the IR bandpass filter 922 in the optical path of the camera 108. In this fourth implementation 912 the ambient infrared light 984 may be used to determine the multimodal image data 112.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a memory, storing first computer-executable instructions; and
    a hardware processor to execute the first computer-executable instructions to:
        determine training data comprising:
            a first modality image,
            a first identity label that is associated with the first modality image and is indicative of a first identity,
            a first modality label indicative of a first modality that is associated with the first modality image,
            a second modality image,
            a second identity label that is associated with the second modality image and is indicative of the first identity, and
            a second modality label indicative of a second modality that is associated with the second modality image;
        determine first intermediate embedding data using a first portion of a machine learning network to process the first modality image;
        determine first embedding data using a second portion of the machine learning network to process the first intermediate embedding data;
        determine second intermediate embedding data using a third portion of the machine learning network to process the second modality image;
        determine intersection embedding data using a fourth portion of the machine learning network to process the first intermediate embedding data and the second intermediate embedding data, wherein the intersection embedding data is representative of features associated with the first intermediate embedding data and the second intermediate embedding data;
        determine XOR embedding data using a fifth portion of the machine learning network to process the first intermediate embedding data and the second intermediate embedding data, wherein the XOR embedding data is representative of features that are not associated with both the first intermediate embedding data and the second intermediate embedding data; and
        determine trained model data based on the first embedding data, the intersection embedding data, and the XOR embedding data.

2. The system of claim 1, wherein:
    the first modality image comprises a first image of a first palm acquired using the first modality, and
    the second modality image comprises a second image of the first palm acquired using the second modality.

3. The system of claim 1, the hardware processor to further execute the first computer-executable instructions to:
    determine query data comprising a multimodal image that depicts features associated with the first modality and the second modality;
    determine third intermediate embedding data using the first portion of the machine learning network and the trained model data to process the multimodal image;
    determine query first embedding data using the second portion of the machine learning network and the trained model data to process the third intermediate embedding data;

determine query intersection embedding data, using the fourth portion of the machine learning network and the trained model data to process the third intermediate embedding data;

determine query XOR embedding data, using the fifth portion of the machine learning network and the trained model data to process the third intermediate embedding data; and determine first identification data that is associated with the multimodal image based on the query first embedding data, the query intersection embedding data, the query XOR embedding data, and previously stored embedding data.

4. The system of claim 3, further comprising:
a scanner, the scanner comprising:
  an infrared light source;
  a camera to acquire the multimodal image;
  an infrared bandpass filter in an optical path of the camera; and
  a polarizer in the optical path of the camera.

5. A computer-implemented method comprising:
accessing training data comprising:
  a first plurality of images, and
  a second plurality of images;
determining first intermediate embedding data using a first portion of a machine learning network to process the first plurality of images;
determining first embedding data using a second portion of the machine learning network to process the first intermediate embedding data;
determining second intermediate embedding data using a third portion of the machine learning network to process the second plurality of images;
determining intersection embedding data using a fourth portion of the machine learning network to process the first intermediate embedding data and the second intermediate embedding data;
determining XOR embedding data using a fifth portion of the machine learning network to process the first intermediate embedding data and the second intermediate embedding data; and
determining trained model data based on the first embedding data, the intersection embedding data, and the XOR embedding data.

6. The method of claim 5, wherein:
the first plurality of images are associated with a first modality, and
the second plurality of images are associated with a second modality.

7. The method of claim 5, further comprising:
determining a plurality of multimodal images;
determining the first plurality of images using a second machine learning network to process the plurality of multimodal images, wherein the first plurality of images are associated with a first modality; and
determining the second plurality of images using a third machine learning network to process the plurality of multimodal images, wherein the second plurality of images are associated with a second modality.

8. The method of claim 5, wherein:
the intersection embedding data is representative of features associated with the first intermediate embedding data and the second intermediate embedding data, and
the XOR embedding data is representative of features that are not associated with both the first intermediate embedding data and the second intermediate embedding data.

9. The method of claim 5, the determining the intersection embedding data comprising:
processing at least a portion of the first intermediate embedding data and the second intermediate embedding data using the fourth portion of the machine learning network to determine a first loss value, wherein the intersection embedding data is representative of features depicted in a first modality image and a second modality image that are labeled as having a same identity; and
the determining the XOR embedding data using the fifth portion of the machine learning network comprising:
  determining a second loss value associated with the XOR embedding data, wherein the XOR embedding data is associated with features that are not in both the first modality image and the second modality image;
  determining, based on the intersection embedding data and the XOR embedding data, a first set of probability distributions;
  determining, based on the first set of probability distributions, a third loss value; and
  determining a total loss value based on the first loss value, the second loss value, and the third loss value;
  wherein the determining the trained model data is further based on the total loss value.

10. The method of claim 9, the determining the first set of probability distributions comprising:
determining, based on a plurality of the intersection embedding data, an intersection probability distribution;
determining, based on a plurality of the XOR embedding data, an XOR probability distribution; and
determining, based on the intersection probability distribution and the XOR probability distribution, the third loss value.

11. The method of claim 5, further comprising:
determining query data comprising a multimodal image that depicts features associated with a first modality and a second modality;
determining third intermediate embedding data using the first portion of the machine learning network and the trained model data to process the multimodal image;
determining query first embedding data using the second portion of the machine learning network and the trained model data to process the third intermediate embedding data;
determining query intersection embedding data using the fourth portion of the machine learning network and the trained model data to process the third intermediate embedding data;
determining query XOR embedding data using the fifth portion of the machine learning network and the trained model data to process the third intermediate embedding data; and
determining first identification data that is associated with the multimodal image based on:
  the query first embedding data,
  the query intersection embedding data,
  the query XOR embedding data, and
  previously stored embedding data.

12. A system comprising:
a memory, storing first computer-executable instructions; and
a hardware processor to execute the first computer-executable instructions to:

determine training data comprising information associated with a plurality of modalities;

determine first intermediate embedding data using a first portion of a machine learning network to process a first plurality of images comprising a first modality;

determine first embedding data using a second portion of the machine learning network to process the first intermediate embedding data;

determine second intermediate embedding data using a third portion of the machine learning network to process a second plurality of images comprising a second modality;

determine intersection embedding data using a fourth portion of the machine learning network to process the first intermediate embedding data and the second intermediate embedding data;

determine XOR embedding data using a fifth portion of the machine learning network to process the first intermediate embedding data and the second intermediate embedding data; and determine trained model data based on the first embedding data, the intersection embedding data, and the XOR embedding data.

13. The system of claim 12, wherein:
the first plurality of images are associated with the first modality, and
the second plurality of images are associated with the second modality.

14. The system of claim 12, wherein:
the first plurality of images comprise multimodal images, and
the second plurality of images comprise multimodal images.

15. The system of claim 12, the hardware processor to further execute the first computer-executable instructions to:
determine a plurality of multimodal images;
determine the first plurality of images using a second machine learning network to process the plurality of multimodal images, wherein the first plurality of images are associated with the first modality; and
determine the second plurality of images using a third machine learning network to process the plurality of multimodal images, wherein the second plurality of images are associated with the second modality.

16. The system of claim 12, wherein:
the intersection embedding data is representative of features associated with the first intermediate embedding data and the second intermediate embedding data, and
the XOR embedding data is representative of features that are not associated with both the first intermediate embedding data and the second intermediate embedding data.

17. The system of claim 12, the hardware processor to further execute the first computer-executable instructions to:
determine a first loss value using the first intermediate embedding data and the second intermediate embedding data, wherein the intersection embedding data is representative of features depicted in a first modality image and a second modality image that are labeled as having a same identity;

determine a second loss value associated with the XOR embedding data, wherein the XOR embedding data is associated with features that are not in both the first modality image and the second modality image;

determine, based on the intersection embedding data and the XOR embedding data, a first set of probability distributions;

determine, based on the first set of probability distributions, a third loss value; and determine a total loss value based on the first loss value, the second loss value, and the third loss value;

wherein the trained model data is further determined based on the total loss value.

18. The system of claim 17, wherein the first computer-executable instructions to determine the first set of probability distributions comprise instructions to:
determine, based on a plurality of the intersection embedding data, an intersection probability distribution;
determine, based on a plurality of the XOR embedding data, an XOR probability distribution; and
determine, based on the intersection probability distribution and the XOR probability distribution, the third loss value.

19. The system of claim 12, the hardware processor to further execute the first computer-executable instructions to:
determine query data comprising a multimodal image that depicts features associated with the first modality and the second modality;
determine third intermediate embedding data using the first portion of the machine learning network and the trained model data to process the multimodal image;
determine query first embedding data using the second portion of the machine learning network and the trained model data to process the third intermediate embedding data;
determine query intersection embedding data, using the fourth portion of the machine learning network and the trained model data to process the third intermediate embedding data;
determine query XOR embedding data, using the fifth portion of the machine learning network and the trained model data to process the third intermediate embedding data; and
determine first identification data that is associated with the multimodal image based on the query first embedding data, the query intersection embedding data, the query XOR embedding data, and previously stored embedding data.

20. The system of claim 19, further comprising:
a scanner, the scanner comprising:
an infrared light source;
a camera to acquire the multimodal image; and
one or more of:
an infrared bandpass filter in an optical path of the camera, or
a polarizer in the optical path of the camera.

* * * * *